United States Patent [19]

Wood

[11] Patent Number: 4,995,577

[45] Date of Patent: Feb. 26, 1991

[54] FISHING PLUG ORGANIZER

[76] Inventor: Barry L. Wood, 140 Hol-Mar Trail, McDonough, Ga. 30253

[21] Appl. No.: 392,585

[22] Filed: Aug. 11, 1989

[51] Int. Cl.$^5$ ............................................. A47B 96/00
[52] U.S. Cl. ................................... 248/205.3; 43/57.1
[58] Field of Search ..................... 248/205.3; 224/920; 211/87; 43/57.1; 206/315.11

[56] References Cited

U.S. PATENT DOCUMENTS

| | | | |
|---|---|---|---|
| 4,003,538 | 1/1977 | Frye | 248/205.3 X |
| 4,829,699 | 5/1989 | Perkins | 43/57.1 |
| 4,834,331 | 5/1989 | Domingo | 248/205.3 |
| 4,892,241 | 1/1990 | Mavrakis | 224/920 X |
| 4,907,704 | 3/1990 | Sounders | 211/13 |

Primary Examiner—Ramon O. Ramirez
Attorney, Agent, or Firm—Haugen and Nikolai

[57] ABSTRACT

To releasibly retain fishing lures to prevent the tangling thereof, a sheet of elastomeric material, formed by bonding synthetic rubber chips with appropriate binders, is used as a support medium from which the lures can be suspended by their hooks. The material in question exhibits rough texture with a random pattern of surface voids of varying size. Even though plugs can be hooked onto it and removed on a frequent basis, the surface appearance of the material is not altered nor does rubber material flake off from the sheet. Hence it remains serviceable and aesthetically pleasing over years of use. The sheet of elastomeric material may be mounted at any convenient location with in a fishing boat. For example, it may be used to line the underside of the lid of a boat's storage compartment.

5 Claims, 1 Drawing Sheet

FISHING PLUG ORGANIZER

BACKGROUND OF THE INVENTION

I. Field of the Invention

This invention relates generally to an apparatus for releasibly supporting a plurality of fishing lures and more particularly to a supporting substrate from which the lures may be hung which is not destroyed or marred over time by repeated usage.

II. Discussion of the Prior Art

Avid fisherman may spend considerable sums on a watercraft on which their sport is carried. A fisherman will typically have a collection of any where from 5 to 100 or more "favorite lures". Such lures may include plugs or spoons having hooks suspended therefrom and when attempts are made to store such lures in a conventional tackle box, the hooks on the several lures tend to become tangled, making it difficult (and sometimes painful) to pick out a particular lure from the group for subsequent attachment to a fishing line.

It has been a practice of many to suspend lures from their hooks on the carpeting often used to line the floor and side walls of the boat's hull. However, because of the nature of that material, after a relatively short period of such practice, the carpeting tends to become torn and shredded as the hooks are pulled free from the fibers. Thus, to maintain the appearance of the watercraft, it becomes necessary to either recarpet or patch the destroyed area.

I am also aware that others have used a closed cell foam material suspended from the boat's gunwale as a surface on which lures can be hung and temporarily retained until a particular one is selected for use. Each time a lure is removed from such a material, a quantity of the material is plucked off from the surface and it, too, becomes unsightly and subsequetly no longer usable after a relatively short period of use.

It is accordingly a principal object of the present invention to provide a fishing lure organizer for use aboard a fishing boat which does not deteriorate over time with repeated usage.

Another object of the invention is to provide a fishing lure organizer made from a material which allows fish hooks to be inserted into it and removed from it many, many times without damage to the material and any appreciable change in its appearance. Still another object of the invention to provide a material from which fishing lures may be suspended by their hooks and which may readily be attached to a convenient and accessible location within a fishing boat.

SUMMARY OF THE INVENTION

The foregoing objects are achieved in accordance with the present invention by providing a planar sheet of elastomeric material formed by the bonding of chopped-up rubber particles with synthetic binders. Such material typically exhibits a rough, pock-marked surface where the voids are of varying size, shape and depth. The material in question has a surface appearance similar to that of a sheet of cork, but unlike cork, does not disintegrate or flake off when picked or punctured by sharp, pointed objects.

The sheet material may be adhesively bonded or otherwise affixed at a desired location within a fishing boat and used as a substrate from which hooked fishing lures can be suspended. Specifically, the hooks on the lure may be embedded into the material which is sufficient to hold the lure in a desired orientation while being stored. When it is desired to use a particular lure, it may be manually grasped and pulled free of the elastomeric substrate without leaving any noticeable hole, tear or other surface defect. The elastic material remains intact and does not disintegrate over time with numerous repeated hook punctures and removals.

DESCRIPTION OF THE PREFERRED EMBODIMENT

Figure 1:
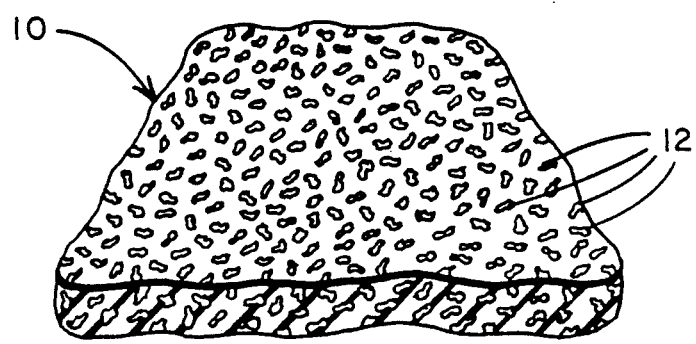
FIG. 1 shows the material used in the lure organizer of the present invention.

Referring first to FIG. 1, there is illustrated a sheet 10 of elastomeric material of a type preferred in the implementation of the present invention. The sheet is fabricated from reprocessed synthetic rubber which is shredded and chopped into small bits and then the resulting particles are mixed with synthetic binders and compressed to create sheets of predetermined thickness (typically 310 mils) wherein the rubber particles are cohesively bonded together. The product is available through the Siplast Company of Irving, Tex., and is sold in rolls under the trademark TRAFBLOC ™.

As can be further seen in FIG. 1, the surface texture of the elastomeric sheet 10 is rather pock-marked, having voids 12 of random size and depth distributed over both major surfaces and through the thickness dimension of the sheet.

The surface voids 12 give the sheet 10 the appearance of a cork sheet, but unlike cork, the elastomeric material from which the sheet is formed is extremely tough and not subject to flaking, abrading or tearing when repeatedly punctured by sharply pointed objects, such as fish hooks. They can be dug into the surface of the sheet 10 and subsequently removed without separating rubber particles from the sheet. In fact, the point of entry and removal cannot even be discerned because of the self-healing characteristics of the rubber itself and the fact that the surface is already pock-marked, thus masking any mark caused by the entry and removal of the pointed object (fish hook).

Figure 2:
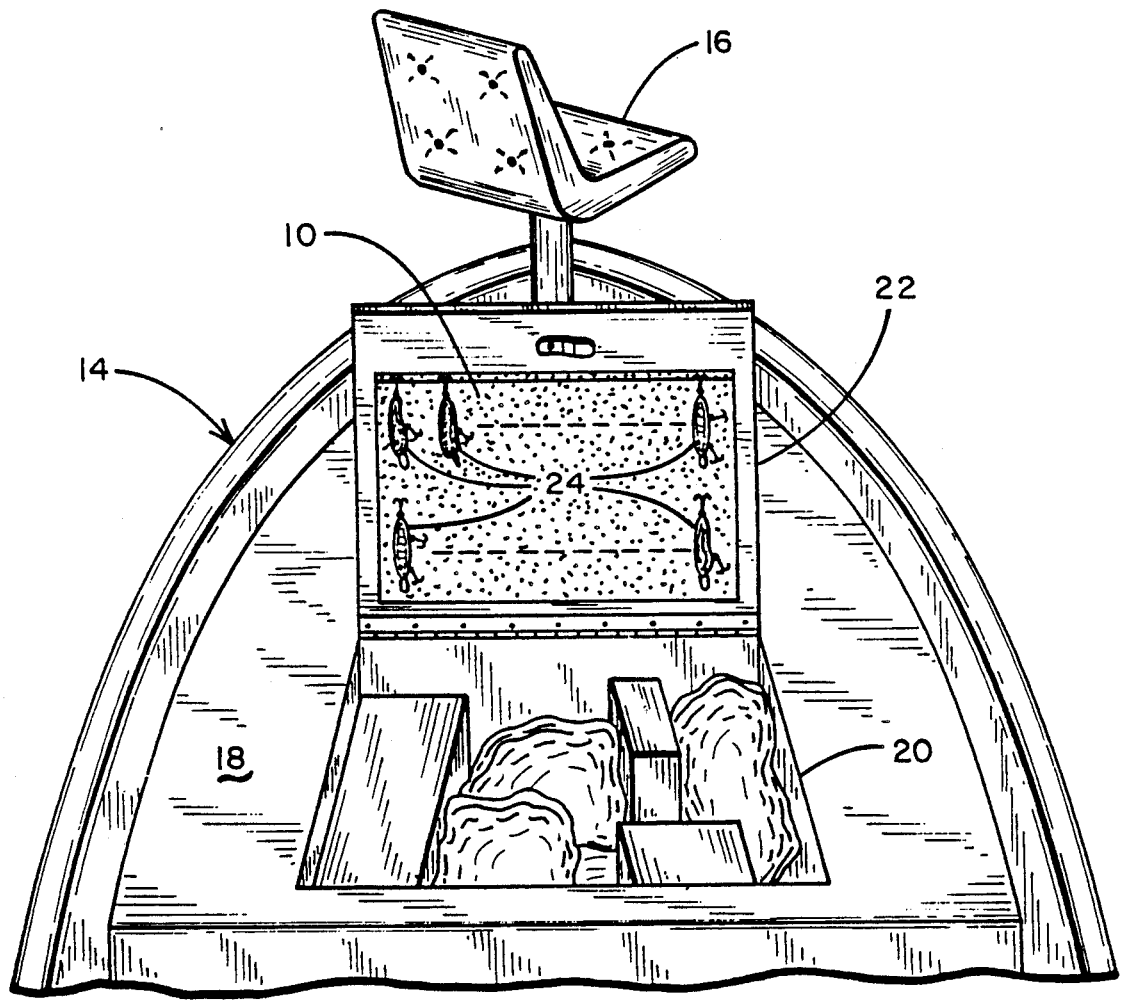
FIG. 2 illustrates the lure organizer of the present invention when it adhered to the underside of the lid on a fishing boat's storage compartment with the lid open.

In accordance with the present invention, the elastomeric sheet material of FIG. 1 may be approximately three-eighth inch thick and is used as a mounting pad whereby a plurality of fishing lures may be held in an orderly condition and prevented from becoming tangled with one another, which is the case when the lures are merely tossed into the bottom of a tackle box. Referring to FIG. 2, there indicated generally by numeral 14 a fishing boat of a type now commonly referred to as a "bass-boat". It includes a pedestal mounted chair 16 in the bow portion thereof which is arranged to swivel so that a fisherman sitting in the chair may turn a full 360°, allowing him to cast a bait in any direction. Formed in the deck 18 of the boat is a storage compartment 20 for storing such things as life jackets, tools, anchor ropes, etc. The storage compartment is provided with a hinged lid 22 which may be lifted to gain access to the interior of the compartment 20.

I have found it convenient to store a collection of different fishing lures, e.g., bass plugs and spoons on the undersurface of the lid 22 by adhesively bonding the sheet 10 thereto. Of course, other fastening means may be used as well. Once the sheet 10 is secured to the lid 22, lures, such as plugs 24, may be suspended from the sheet 10 by forcing a pointed hook on each end of the plug into the sheet 10. In this way, a plurality of lures can be arranged in rows and columns on the sheet and they will be held fast in that orientation even when the lid 22 is shut. Thus, the hooks on the lures will not snag the remaining contents of the storage compartment 20. It has been found that the lures hold fast in their organized position even when the boat is operated at high speeds in rough water.

The lures become immediately accessible upon opening the lid 22. The fisherman may reach down from his position on the chair 16, grasp a desired one of the lures and pull it free from the sheet material 10 for later connection to his or her fishing line. As mentioned above, this maneuver can be performed repeatedly, many, many times with no noticeable damage to the sheet material. It remains neat in appearance and serviceable for the life of the boat.

While I have shown the organizer of the present invention attached to the underside of a lid 22 on a storage compartment 20, those skilled in the art will recognize that the sheet 10 may be mounted at any convenient location in the watercraft and it is not intended that the invention be limited to the particular configuration illustrated in FIG. 2. That is to say, the mounting location is a matter of choice or preference. So, too, is the shape of the organizer. It may be planar or curved.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures can be accomplished without departing from the scope of the invention itself.

What is claimed:

1. An organizer for retaining a plurality of barbed hook-carrying devices, such as fishing lures, in a desired, predetermined orientation relative to one another to prevent tangling thereof, comprising a piece of relatively tough strong, tear-resistant elastomeric material exhibiting a coarse surface texture characterized by a random pattern of surface voids of varying size, the piece being further capable of having one or more barbed hooks of a lure pierce the material to retain the device in the desired position on the piece and be withdrawn from it to remove the device on a frequency basis without substantially altering the surface appearance of the material of the piece.

2. The organizer as in claim 1 wherein said piece of material is formed from reprocessed, coarsely divided synthetic rubber adhered together to form a composite using at least one synthetic binder.

3. The organizer as in claim 2 and further including means for adhering said piece of material to a selected surface on a fishing craft.

4. The organizer as in claim 3 wherein said selected surface is the underside of a storage compartment lid and said piece of material is generally planar.

5. The organizer as in claim 3 wherein said means for adhering includes a pressure sensitive adhesive coated on one side of said planar piece of material.

* * * * *